United States Patent [19]

Hida

[11] Patent Number: 4,948,761
[45] Date of Patent: Aug. 14, 1990

[54] PROCESS FOR MAKING A SILICON CARBIDE COMPOSITION

[75] Inventor: George T. Hida, N. Tonawanda, N.Y.

[73] Assignee: Benchmark Structural Ceramics Corporation, Amherst, N.Y.

[21] Appl. No.: 339,199

[22] Filed: Apr. 14, 1989

Related U.S. Application Data

[63] Continuation-in-part of Ser. No. 279,428, Dec. 2, 1988, which is a continuation-in-part of Ser. No. 254,175, Oct. 6, 1988.

[51] Int. Cl.$^5$ ............................................. C04B 35/56
[52] U.S. Cl. ...................................... 501/89; 501/95; 264/66
[58] Field of Search ....................... 501/89, 95; 264/66

[56] References Cited

U.S. PATENT DOCUMENTS

| | | | |
|---|---|---|---|
| 1,918,317 | 7/1933 | Benner et al. | 501/88 |
| 2,854,364 | 9/1958 | Lely | 148/1.5 |
| 2,862,795 | 12/1958 | Lowe | 23/208 |
| 2,886,454 | 5/1959 | Todd | 106/43 |
| 3,375,073 | 3/1968 | McMullen | 23/204 |
| 3,704,230 | 11/1972 | Loricchio | 252/182 |
| 4,069,060 | 1/1978 | Hayashi et al. | 106/65 |
| 4,284,612 | 8/1981 | Horne, Jr. et al. | 423/345 |
| 4,778,778 | 10/1988 | Mallia et al. | 501/96 |

OTHER PUBLICATIONS

"Study of Solid-State Aluminothermal Reactions: Influence of Activation and Moderation Processes", George T. Hida (Thesis, Israel Institute of Technology, Haifa, Israel, Apr. 1987).

Primary Examiner—Mark L. Bell
Assistant Examiner—Deborah Jones
Attorney, Agent, or Firm—Howard J. Greenwald

[57] ABSTRACT

A process for pressing a ceramic composite which is comprised of alpha silicon carbide whiskers and alpha alumina oxide is disclosed. The composite material is blanketed with nitrogen, heated to a temperature of from about 1,250 to about 1,450 degrees centigrade, thereafter heated to a temperature of from about 1,650 to about 1,900 degrees centigrade while pressure on the system is increased, and thereafter maintained under specified temperature and pressure conditions for from about 30 to about 90 minutes.

8 Claims, 2 Drawing Sheets

FIG. 2

PROCESS FOR MAKING A SILICON CARBIDE COMPOSITION

CROSS-REFERENCE TO RELATED APPLICATION

This is a continuation-in-part of applicant's copending application U.S. Ser. No. 279,428, filed Dec. 2, 1988, which in turn was a continuation-in-part of copending application copending application U.S. Ser. No. 254,175, filed Oct. 6, 1988.

FIELD OF THE INVENTION

A process for preparing a ceramic composite which is comprised of alpha-silicon carbide whiskers and alpha-alumina powder.

BACKGROUND OF THE INVENTION

Ceramic composites comprised of silicon carbide whiskers and alumina powder are well known to prior art. Thus, by way of illustration, U.S. Pat. No. 4,543,345 discloses a silicon carbide whisker-alumina ceramic composite with good fracture toughness.

One problem with the ceramic composites presently available is that they cost from about eighty to one hundred and twenty dollars per pound, a price which makes them too expensive for certain applications.

In 1987, applicant George T. Hida disclosed a process for preparing a silicon carbide-whisker/alumina composite. In his Ph.D. Thesis, which was entitled "Study of Solid-State Aluminothermal Reactions: Influence of Activation and Moderation Processes," which was submitted to the Senate of the Technicron—Israel Institute of Technology in Haifa, Israel in Feb. of 1987, and which was published in Apr. of 1987, a reaction was disclosed in which three moles of silica were reacted with four moles of aluminum and three moles of carbon. The silica reagent was 200/230 mesh fraction quartz sand; the aluminum reagent was 325 mesh aluminum powder; and the carbon reagent was carbon black. Stoichiometric amounts of these reagents were mixed, the mixture was compacted into pellets by cold pressing in a die, and the pressed pellets were placed into a furnace which had been preheated to 720 degrees centigrade and were thereafter ignited.

The process disclosed in Hida's 1987 thesis was a substantial improvement over prior art processes for preparing silicon carbide whisker/alumina composite materials. However, it did not reduce the cost of making the composite down to commercially suitable levels.

It is an object of this invention to provide a process for preparing a pressed silicon carbide whisker/alumina composite at a cost which is substantially cheaper than is currently possible.

SUMMARY OF THE INVENTION

In accordance with this invention, there is provided a process for pressing a ceramic composite which is comprised of alpha silicon carbide whiskers and alpha aluminum oxide powder. In this process, the composite material is blanketed with nitrogen, heated to a temperature of from about 1,250 to about 1,450 degrees centigrade, thereafter heated to a temperature of from about 1,650 to abot 1,900 degrees centigrade while pressure on the system is increased, and thereafter maintained under specified temeprature and pressure conditions for from about 30 to about 90 minutes.

DESCRIPTION OF THE DRAWINGS

The present invention will be more fully understood by reference to the following detailed description thereof, when read in conjunction with the attached drawing, wherein.

DESCRIPTION OF THE PREFERRED EMBODIMENTS

In the first step of the process of this invention, a specified composite material is provided. This composite material is comprised of at least about 35 weight percent of alpha silicon carbide, the remainder of said material consisting essentially of alpha-alumina. At least 80 weight percent of the silicon carbide in the composite is in whisker form, with the whiskers having a diameter of from about 0.5 to about 1.5 microns, a length of from about 20 to about 200 microns, and an aspect ratio of from about 40 to about 120. About 100 percent of the alumina in the composite has a particle size within the range of from about 0.5 to about 5.0 microns. The composite material preferably contains less than about 0.1 percent of free carbon and less than about 0.1 percent of silica.

In the process of this invention, the composite described above may be obtained by a method which produces a substantially higher yield of the silicon carbide component by an aluminothermic reduction process followed by in situ synthesis of silicon carbide. This method is described below.

METHOD FOR PRODUCING THE SILICON CARBIDE COMPOSITE

The term whisker, as used in this specification, refers to a needle-like single crystal of metallic and nonmetallic compounds; this crystalline form possesses very good strength properties, approaching maximum theoretical strength and making it suitable for reinforcement of metal, ceramic, glass, or polymer matrices. The term silicon carbide whiskers refers to single crystals in needle-like form containing only the alpha silicon carbide phase, having a diameter of from about 0.5 to about 3 microns, having a length of at least about 10 microns, and having an aspect ratio of less than about 1:10. The term aspect ratio is the ratio of the diameter (or the equivalent diameter) of the whisker, divided by its length. In one preferred embodiment, the aspect ratio of the whisker is less than about 1:20.

The silicon carbide whiskers comprising the composite of this invention can have different cross-sectional shapes. Thus, e.g., they may be circular, square, rectangular, hexagonal, and the like. When the whisker has a substantially circular cross-sectional shape, then the diameter will be from about 0.5 to about 3.0 microns and, preferably, from about 0.5 to about 1.5 microns. When the cross-sectional shape of the whisker is not substantially circular, then it will have an equivalent diameter of from about 0.5 to about 3.0 microns and, preferably, from about 0.5 to about 1.5 microns.

The silicon carbide whiskers comprising the composite of this invention consist essentially of alpha silicon carbide. As is known to those skilled in the art, the crystalline structure of silicon carbide derives from the diamond structure in which half of the carbon atoms are replaced by silicon atoms. Each atom is surrounded tetrahedrally by four different atoms and linked with them by covalent bonds. Alpha silicon carbide is a modification of the crystalline structure having a hexagonal crystalline network with several arrangements coexisting within the same conditions of temperature and pressure and called polytypes. See, e.g., pages 486 to 488 of R. Abramovici's "Materii Prime Ceramice," (Institutul Politechnic, Traian Vuia, Timisoara, Rumania, 1974). Also see pages 366-367 of the McGraw-Hill Encyclopedia of Science & Technology, Volume 12(McGraw-Hill Book Company, New York, 1977). The disclosure of these publications are hereby incorporated by reference into this specification.

The composite produced by the process of this invention is also comprised of alpha aluminum oxide. As used in this specification, the term alpha aluminum oxide refers to the most stable form of aluminum oxide called also "corundum". See, e.g., pages 331-332 of said Abramovici book.

In the first step of the process of this invention, a multiplicity of pellets are first prepared. Each of these pellets has a specified ratio of silica, aluminum, and carbon.

The pellets used in the process of this invention contain from about 30 to about 38 weight percent of aluminum material selected from the group consisting of aluminum and aluminum alloy, by total weight of silica, aluminum, and carbon in the pellets.

The aluminum or aluminum alloy should be in powder form and will have a specific surface area of from about 0.2 to about 1.1 square meters per gram and, preferably, from about 0.6 to about 0.7 square meters per gram.

Either pure aluminum, aluminum alloy material, or mixtures thereof may be used. Suitable aluminum alloys include, for example, alloys of aluminum with lithium, silicon, magnesium, manganese, iron, and the like.

In one embodiment, the aluminum material used is in the form of fine aluminum flakes. Thus, by way of illustration, one may use fine aluminum flakes obtainable from the Riedel de Haen Company of West Germany (catalog number 110100). This material is a coated aluminum comprised of 94 percent aluminum and less than 0.1 percent of oxygen; and at least about 80 percent of these flakes are smaller than 9 microns.

In the pellet used in the process of this invention, the specified weight ratio of aluminum is based upon the concentration of pure aluminum. When an aluminum alloy material is used, or when a mixture of aluminum or aluminum alloy material is used, the aluminum content of the alloy is first calculated, and this aluminum content is then used to determine the aluminum content of the pellet.

The particle size distribution of the aluminum material will range from about 4 to about 28 microns and, preferably, will be from about 6 to about 12 microns. Particle size analysis may be conducted by means well known to those skilled in the art. Thus, for example, one can use the procedure described on pages 8-2 to 8—8 of Perry and Chilton's "Chemical Engineer's Handbook," Fifth Edition (McGraw-Hill Company, New York, 1973). The Perry and Chilton book also describes the specific surface area test described elsewhere in this specification (see, e.g., page 8-7; the disclosure of the entire Perry and Chilton book is hereby incorporated by reference into this specification. Test methods are also described in the 1988 Annual Book of ASTM Standards, Section 15, Volume 15.02 (ASTM, 1916 Race Street, Philadelphia, Pennsylvania, 1988), the disclosure of which is hereby incorporated by reference into this specification.

At least about 80 weight percent of the aluminum particles will have diameters of from about 6 to about 12 microns. It is preferred that at least about 85 weight percent of the aluminum particles have a diameter of from about 6 to about 12 microns. In an even more preferred embodiment, at least about 90 weight percent of the aluminum particles have a diameter of from about 6 to about 12 microns.

In one embodiment, the aluminum material contains from about 0 to about 1.0 percent, by weight of aluminum material, of combined oxygen. As used in this specification, the term combined oxygen refers to oxygen which is combined with aluminum and/or aluminum alloy and, usually, is in the form of a metal oxide. The amount of combined oxygen is determined by evaluating the total oxygen present by conventional means such as, e.g., spectral analysis.

The pellets used in the process of this invention are also comprised of amorphous carbon. These pellets comprise from about 10 to about 14 weight percent, by total weight of silica, aluminum, and carbon, of amorphous carbon.

By way of illustration, one can use carbon black obtained from the Pelleter Company of the United States (code "SRF") which has a specific surface area of 27.1 square meters per gram and is comprised of 99.28 percent of carbon, 0.37 percent of hydrogen, 0.03 percent of sulfur, 0.25 percent ash, and 0.07 percent of oxygen. By way of further illustration, one can use amorphous carbon obtainable from the Aldrich Chemical Company, Inc. of 940 West Saint Paul Avenue, Milwaukee, Wisconsin and sold as code 27,720-7 in the 1988-1989 Aldrich catalog.

It is essential that the carbon used in the pellet of this invention be amorphous and have a specific surface area of at least about 4 square meters per gram. The specific surface area may be determined by means well known to those skilled in the art. Thus, for example, specific surface area, or the surface area per unit mass of material (square meters per gram) can be measured by using gas adsorption techniques via the well known BET equation. This measurement can be conducted on a Micromeritics Flow Sorb II 2300, model 2300/00000/00 (made by Micromertics Company, Norcross, Georgia). The test procedure is described in the instruction manual for this machine (see, e.g., Manual P/N: 230/42804/00 published by Micxromeritics in 1985). As is known to those skilled in the art, this measurement also may be conducted on the Monosorb model MS-4 single point analyzer or the Quantosorb QS-7 multi-point analyzer, both of which are manufactured by the Quantachrome Corporation of 6 Aerial Way, Syosset, New York 11791.

In one preferred embodiment, the amorphous carbon contains less than about 1.5 percent, by weight of carbon, of combined sulfur. The amount of combined sulfur may be determined by means well known to those skilled in the art. Thus, by way of illustration, one can use the combustion method described on pages 9-4 to 9-5 of said Perry and Chilton's "Chemical Engineers' Handbook."

The pellets used in this invention are also comprised of from about 52 to about 62 weight percent of silica, by total weight of silica, aluminum, and carbon in the pellet.

By way of illustration, a suitable silica which may be used is commercially available and known as "Cab-O-Sil M-5," Fumed Silica, an amorphous silicon dioxide manufactured by the Cabot Corporation, Cab-O-Sil Division, Tuscola, Illinois 61953; this silica has a specific surface area of 200 plus or minus 25 square meters per gram; and the total oxygen content of this silica indicates that it contains less than 1.0 percent of silicon-silicon bonds.

The silica used to prepare the pellets of this invention preferably has a specific surface area of from about 1.2 to about 400 square meters per gram and, more preferably, from about 50 to about 300 square meters per gram. In an even more preferred embodiment, the specific surface area of the silica is from about 125 to about 250 square meters per gram. In the most preferred embodiment, the silica has a specific surface area of from about 175 to about 225 square meters per gram.

The silica used can be either amorphous or crystalline. As used in this specification, the term amorphous refers to a solid substance which, although it may possess microcrystals, does not indicate the existence of any crystalline structure with X-ray diffraction. Even though the amorphous material may possess some degree of crytallinity, such crystallinity is less than that required for detection with X-ray diffraction technology. Thus, for example, a solid material which does not crystallize and which does not possess definite geometrical shape (as determined by X-ray diffraction analysis) is amorphous within the meaning of this invention.

The term crystalline, as used in this invention, indicates a substance which, when subjected to X-ray diffraction analysis, indicates the presence of crystals.

It is preferred that the silica used to prepare the pellets of this invention be amorphous. It is also preferred that the silica contain less than about 1.0 percent, by total weight of silica, of silicon-silicon bonds. The extent to which the silica contains silicon-silicon bonds may be determined by analyzing the total oxygen content of the silica; to the extent, if any, that the total oxygen content is less than stoichiometric, silicon-silicon bonds are present, and the extent to which they are present can be calculated.

In one preferred embodiment, the pellet of this invention is comprised of from about 1 to about 5 percent, by weight of silica, aluminum, carbon, and carbon monoxide source, of a source of carbon monoxide in a condensed phase. The term condensed phase, as used in this specification, refers to a material which is either liquid or solid but is not gaseous. This carbon monoxide source is designed to generate carbon monoxide when it is is subjected to a temperature of from about 700 to about 1,600 degrees Centigrade for no more than about 1.0 millisecond. Suitable sources of carbon monoxide include fatty acids containing from about 10 to about 24 carbon atoms and can be monocarboxylic or dicarboxylic. Suitable fatty acids include acids such as caprylic acid, capric acid, lauric acid, myristic acid, palmitic acid, stearic acid, oleic acid, linoleic acid, erucic, brasidic, elaidic, stearolic, mixtures thereof, and the like. Other sources of carbon monoxide include fats corresponding to said fatty acids.

Stearic acid is a preferred source of carbon monoxide. By way of illustation, one suitable stearic acid may be obtained from the Aldrich Chemical Company of 940 West Saint Paul Avenue, Milwaukee, Wisconsin (catalog number 17,536—6 of the 1986-1987 Aldrich catalog).

In one preferred embodiment, the pellet used in the process of this invention is comprised of from about 1 to about 5 weight percent, by combined weight of silica, aluminmum, and carbon, of a source of hydrogen fluoride in a condened phase. In a more preferred embodiment, from about 2 to about 4 percent of the source of hydrogen fluoride is present in the pellet. In the most preferred embodiment, about 3 percent of the source of hydrogen fluoride is present in the reaction mixture.

The source of hydrogen fluoride is designed to generate hydrogen fluoride when subjected to a temperature of from about 200 to about 400 degrees centigrade for from about 1 to about 20 minutes. Potassium hydrogen fluoride is a suitable source of hydrogen fluoride, and it may be obtained, e.g., from Alfa Products, Thiokol Ventron Division, 152 Andover Street, Danvers, Maine (catalog number 89714). By way of illustration and not limitation, other suitable sources of hydrogen fluoride include any material which will contains the bifluor ion [$HF_2$] such as, e.g., sodium hydrogen fluoride, ammonium hydrogen fluoride, and the like.

In one preferred embodiment, the pellets of this invention are comprised of from about 0.1 to about 1.0 percent (by weight of silica, aluminum, carbon, and metal-containing component) of a metal-containing component selected from the group consisting of ferric oxide, ferro-ferric oxide, manganese dioxide, and titanium dioxide. It is preferred to use from about 0.5 to about 1.0 weight percent of this metal-containing component. In the most preferred embodiment, said component is selected from the group consisting of ferric oxide and manganese dioxide.

By way of illustration, one may use a ferric oxide obtained from the Research Organic/Inorganic Chemical Corp. of 9068 DeGarmo Street, Sun Valley, California 913252.

In one especially preferred embodiment, the pellets are comprised of the specified amounts of silica, aluminum, and carbon (each by total weight of pellet) and, additionally, the specified amounts of the source of carbon monoxide, the source of hydrogen fluoride, and the metal-containing component.

In one preferred embodiment, certain specified mixtures of various components are first prepared and thereafter mixed with each other. A mixture of the carbon monoxide source and nonaqueous liquid is prepared, and this mixture is then mixed with silica to prepare a silica slurry. A mixture of the carbon and any metal-containing component used and any source of hydrogen fluoride used and any moderator used is prepared. After these two mixtures have been prepared, the silica slurry is mixed with the aluminum material and the carbon-containing mixture.

The carbon material, which preferably is amorphous, is mixed with any source(s) of hydrogen fluoride used, and/or any metal-containing component used, and/or any moderator used; and this carbon-containing mixture is thereafter mixed with a silica slurry and with aluminum. In this embodiment, it is preferred to grind the carbon and the sources carbon monoxide, and/or hydrogen fluoride, and/or metal-containing component in a jar mill to slightly agglomerate them. Thus, for example, the mixture can be ground for from about 1 to about 2 hours with alumina grinding media.

The specified amounts of silica, aluminum, carbon, and sources of carbon monoxide, hydrogen fluoride, and metal-containing component are pelletized in order to prepare a multiplicity of pellets with a specified size. These pellets are substantially spherical, although other irregularly-shaped pellets also may be used. The pellets used in the process of this invention will preferably have a maximum dimension of from about 12 millimeters, although pellets with larger maximum dimensions also can be used. The pellets used will have a minimum dimension of about 4 millimeters. Thus, in the preferred embodiment wherein spherical pellets are used, the diameter of these pellets will range from about 4 to about 12 millimeters and, preferably, from about 6 to about 10 millimeters.

The pellets produced by the process of applicant's invention, contain from about 80 to about 92 volume percent of solid material. The solid material in the pellets has the same composition as the slurry used to prepare the pellets.

The pellets produced by the process of this invention have an apparent density (bulk density) of from about 0.3 to about 1.7 grams per cubio centimeter. It is preferred that each pellet have a density of from about 0.3 to about 0.7 grams per cubic centimeter. It is even more preferred that such density be from about 0.3 to about 0.5 grams per cubic centimeter. Bulk density may be determined by means well known to those skilled in the art. Thus, by way of illustration and not limitation, one can use the procedures described in J. T. Jones and M. F. Berard's "Ceramics: Industrial Processing and Testing," (The Iowa State University Press, Ames Iowa, 1972), the disclosure of which is hereby incorporated by reference into this specification.

The pellets produced by the process of applicant's copending patent application U.S. Ser. No. 254,178 (filed Oct. 6, 1988) also contain from about 80 to about 92 volume percent of solid material, and also have a minimum dimension of about 4 millimeters; the disclosure of such copending case is hereby incorporated by reference into this specification. However, these latter pellets each have a density of from about 0.3 to about 1.2 grams per cubic centimeter; and the solid material in these pellets contains from about 17 to about 22 weight percent of aluminum material, from about 19 to about 24 weight percent of amorphous carbon, from about 56 to about 65 weight percent of silica, from about 1 to about 5 weight percent of a source of hydrogen fluoride, and from about 1 to about 5 weight percent of a source of carbon monoxide, and from about 0.1 to about 1.0 percent of said metal-containing componnt.

Figure 1:
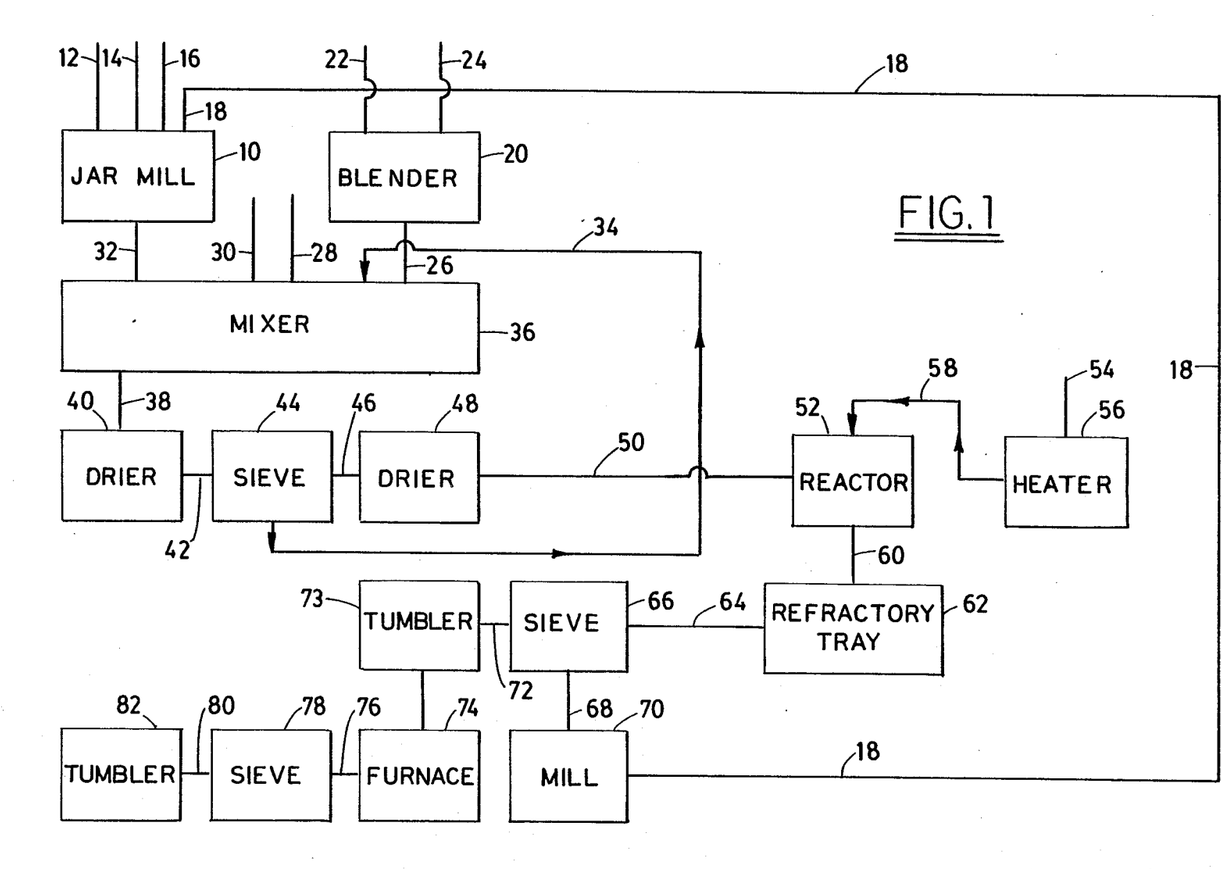
FIG. 1 is a flow sheet illustrating a preferred process of the invention.

Referring to FIG. 1, a preferred process for preparing the pellets of this invention is disclosed. In this process, into jar mill 10 is fed amorphous carbon via line 12, ferric oxide via line 14, and potassium hydrogen fluoride via line 16. Other mills also can be used instead of jar mill 10; thus, e.g., one can use the mills described on pages 8-25 to 8-45 of said Perry and Chilton's handbook.

In general, the carbon may be mixed with any source of metal-containing component used, any source of hydrogen fluoride used, and any moderator (described later on in this specification) used until a carbon agglomerate is obtained. In this step, the carbon, the source of metal-containing component, and/or the source of hydrogen fluoride, and/or the moderator are ground in a mill. It is preferred to grind these materials for from about about 1 to about 2 hours in a jar mill with alumina and/or zirconia grinding media. However, other grinding media, grinding devices, and grinding times can be used to obtain a similarly ground mixture. The ground carbon agglomerate mixture is characterized by having a grey uniform color without any visible red spots or white spots.

One amorphous carbon which can be used is Huber Corporation's pelletized carbon black, type N990; 222 grams of such carbon can be charged to mill 10. One ferric oxide which can be used is Pfizer Corporation's synthetic iron oxide type R-2199; 11.0 grams of this ferric oxide can be charged to mill 10. One potassium hydrogen fluoride which can be used is Aldrich Corportion's reagent number 23,928-3 (also referred to as potassium bifluoride); 80.0 grams of this reagent can be charged to ball mill 10.

In one embodiment, a ground moderator (described later on) is fed to mill 10 via line 18; 40 grams of moderator can be fed to the mill. This moderator may contain about 0.1 percent (by weight of moderator) of a surfactant such as, e.g., oleic acid.

It is preferred that jar mill 10 contain sintered alumina and/or zirconia grinding media. The reagents in jar mill 10 should be ground for about 2.0 hours at a speed of about 90 r.p.m. to produce a homogenous mixture which has a uniform grey color and no visible red or white spots.

In addition to preparing the carbon agglomerate mixture desdcribed above, one should separately prepare a silica slurry by a process in which a mixture of nonaqueous liquid and carbon monoxide source is first prepared, and the mixture of nonaqueous liquid and carbon monoxide source is then mixed with the silica.

The mixture of nonaqueous liquid and carbon monoxide source may be prepared in blender 20. Into blender 20 should be fed a non-aqueous solvent such as, e.g., petroleum ether via line 22. The non-aqueous liquid mixture prepared in blender 20 is thereafter mixed and-/or blended with silica.

The nonaqueous liquid used preferably is readily volatile at a temperature of about 80 degrees Centigrade. This non-aqueous liquid may be either a flammable or nonflammable solvent.

It is preferred to use a non-aqeuous liquid which volatilizes at a temperature of about 60 degrees Centigrade.

Suitable flammable non-aqueous solvents include acetone, benzene, toluene, n-petroleum ether, and the like. Thus, by way of illustration and not limitation, one can use the petroleum ethers identified as reagents 26,173-4, 30,031-4, and 18,451-9 on page 1183 of the 1988-1989 Aldrich catalog.

In one embodiment, nonflammable, non-aqueous solvents are used. Such suitable solvents include carbon tetrachloride, carbon disulfide, and the like.

A source of carbon monoxide, such as a fatty acid, is mixed with the nonaqueous liquid in the blender. A fatty acid, such as stearic acid, may be fed into the blender va line 24, where it is blended, e.g., with nonaqueous liquid such as petroleum ether. A petroleum ether which may be used is one which is obtained from Aldrich Corporation, has a boiling point of between 35 and 60 degrees centigrade, and is identified as reagent 32,044-7; 200 milliliters of this petroleum ether may be charged charged to blender 20. A fatty acid which may be used is the stearic acid which is obtained from Aldrich Corporation identified as reagent 17,536-6; 4 grams of this stearic acid may be charged to blender 20. The petroleum ether and the stearic acid may be be blended at a speed of about 1,500 r.p.m. Higher or lower blending speeds also may be used.

The petroleum ether mix from blender 20 is mixed with the silica prior the time any other reagents are contacted with either the silica or the petroleum ether mix; it is critical that the silica be mixed with the nonaqueoues solvent/fatty acid mixture prior to the time it is mixed with either the aluminum material and/or the carbon.

The mixing may occur in a mixer other than mixer vessel 36; in the embodiment shown in FIG. 1, the mixing occurs in mixer 36. Suitable mixers are described on pages 19-3 to 19-23 of said Perry and Chilton's handbook.

The petroleum ether mix and the silica may be mixed and/or blended. When it is mixed, it may be mixed at a speed of about 160 r.p.m. for about 30 minutes until the silica is well mixed. The term well-mixed, as used in this case, means well-dispersed.

All of the silica is mixed with a sufficent amount of the non-aqueous solvent/carbon monoxide source mixture to prepare a well-dispersed silica slurry with a solids content of from about 35 to about 55 volume percent and, preferably, from about 40 to about 50 volume percent. Thus, for example, 200 milliliters of the mix from blender 20 may be mixed with 66 grams of silica. By way of illustration, one suitable silica is Cabot's Cab-O-Sil Fumed Silica Type M-5. The mixing may be effected by means well known to those skilled in the art. Thus, by way of illustration and not limitation, one may use any of the mixing and/or blending processes and/or apparatuses described on pages 21-30 to 21-36 of Perry and Chilton's "Chemical Engineers' Handbook," Fifth Edition, supra, the disclosure of which is hereby incorporated by reference into this specification. Thus, e.g., one can mix the silica and the solvent with an Eirich mixer.

Those skilled in the art are familiar with the Eirich Machines and their use in mixing and/or blending solids. Reference may be had, e.g., to an article entitled "Mixing Techniques and Mixing Equipment" first published in Aufberteitungs-Teklchnick 1976 and republished in publication 10052us-2000-683 by the Eirich Machines Ltd of 521 Fifth Avenue, New York, New York, the disclosure of which is hereby incorporated by reference into this specification. Reference also may be had to other Eirich publications entitled "Eirich Intensive Mixers -The complete rnage of mixers" (GM 885-4us), "Eirich Intesnive Mixer" for vacuum of pressure operation (Edition 35 e/486), "Eirich Type R Intensive Mixer," and the like. Each of these publications is hereby incorporated by reference into this specification.

The silica is preferably mixed or blended with the non-aqueous liquid/carbon monoxide source mixture for from about 10 to about 30 minutes until a well-mixed silica slurry is obtained.

After the well-mixed silica/solvent slurry has been prepared, then the aluminum and the ground carbon agglomerate are added to the slurry. It is preferred to add these materials to the vessel in which the silica slurry is present. This vessel is preferably a closed vessel so that, during mixing of the slurry, volatile solvent does not escape from it.

Thus, after the well-mixed silica slurry has been prepared, it is then mixed with aluminum powder, which is added via line 30. A suitable aluminum powder is Alcoa Corporation's atomized aluminum powder grade 6401. 36 grams of the aluminum powder may be added via line 30 to the reaction mixture.

At the same time that the aluminum powder is added to the reaction mixture, or thereafter, a portion of the carbon agglomerate mixture from mill 10 may be added through line 32 and/or the recycle material may be added through line 34. In general, up to about 20 grams of recycle may be added through line 34. Thus, in the embodiment illustrated in the drawing, 17 grams of carbon agglomerate from mill 10 are added to the mixing vessel via line 32.

The silica/aluminum/carbon agglomerate/solvent mixture thus prepared is then preferably mixed in the a closed vessel for at least about 2 hours and, preferably, from about 2 to about 4 hours. Any of the mixers described above can be used to stir this mixture. In one preferred embodiment, in addition to being closed, the mixing vessel is also leakproof. In one embodiment, the reaction mixture is mixed at a speed of 160 r.p.m. for about 4 hours.

Once all the reagents have been added to mixer 36 and mixed, they may be discharged from mixer vessel 36 and passed via line 38 to drier 40 wherein the slurry partially dried.

Suitable dryers known to those skilled in the art may be used to dry the slurry. Thus, for example, one may use the driers described on pages 20-4 to 20-58 of said Perry and Chilton's handbook.

The slurry is partially dried to a moisture content of from about 8 to about 20 percent, by weight.

The partially dried slurry is then pelletized by sieving in a wet-mixing process which optimizes the concentration of long silicon carbide whiskers in the final product.

Separation of solids by screening and sieving is well known to those skilled in the art and is described, e.g., on pages 21-37 to 21-44 of said Perry and Chilton's Chemical Engineers' Handbook, supra, the disclosure of which is hereby incorporated by reference into this specification. As is known to those skilled in the art, the size of the sieve openings used will dictate what size pellets will be obtained from the dried slurry.

In one preferred embodiment, illustrated in FIG. 1, the partially dried slurry is passed via line 42 to multideck vibratory sieve 44, wherein it is pelletized. Multideck vibratory sieve 44 contains at least a top sieve and a bottom sieve and, preferably, is a twin-deck vibratory sieve. In this embodiment, two sieves are used to pelletize the slurry and produce the pellets of this invention. The slurry is first passed through a a top sieve with sieve openings of from about 8 to about 14 millimeters and, preferably, openings of from about 10 to about 12 millimeters. The slurry which passes through this top sieve is then contacted with a bottom sieve with sieve openings of 4 millimeters. The pellets used in the process of this invention are formed between the top sieve and the bottom sieve.

The material passing through the bottom sieve of twin vibratory sieve 44 can be recycled via line 34 into mixer 36 and reslurried therein.

The pelletized material from sieve 44 is passed via line 46 to drier 48. In the drier, the pellets are dried to a moisture content of from about 0.1 to about 2.0 percent, by weight. In general, the pellets are dried at a temperature of about 100 degrees centigrade for about 2 hours.

The dried pellets are transferred via line 50 to reactor 52 which is equipped with an igniter. In one preferred embodiment, in such reactor, the pellets are first subjected to a preignition, low-temperature heat treatment step.

In the preheating step, the dried pellets are then poured into a reactor and preheated while under an atmosphere selected from the group consisting of air, nitrogen, or inert gas. The pellets are preheated to a temperature of from about 200 to about 300 degrees centigrade; it generally takes no longer than about 40 minutes before the pellets reach this temperature. In general, the preheating is conducted for a period of from about 10 to about 40 minutes and, preferably, from about 15 to about 25 minutes. It is preferred to conduct the preheating in an inert atmosphere. Suitable inert gases include argon, helium, and the like. The most preferred inert gas is argon. Mixtures of the above inert gases also can be used.

Once the pellets have been preheated to a temperature of from about 200 to about 300 degrees centigrade, they are ignited. It is preferred that the gas used in the ignition system, which preferably is inert, be under ambient pressure, although slight deviations from ambient pressure are allowable. In general, one may use gas at a pressure of from about 90 to about 110 percent of ambient pressure.

In one preferred embodiment, the dried pellets are preheated while under nitrogen atmosphere. In this embodiment, it is preferred to heat the nitrogen to a temperature of about 400 degrees centigrade, pass it into the reactor, and contact it with the pellets in order to preheat them. Thus, nitrogen is fed via line 54 into heater 56 wherein it is heated to a temperature of 400 degrees centigrade and thereafter fed via line 58 into reactor 58 wherein it is contacted with the pellets.

The pellets are then ignited. Any suitable source of heat, such as a spark, a flame, a beam, a hot wire, and the like, can be used to ignite the pellets. In general, the ignition source must be at a temperature of at least about 670 degrees centigrade and, preferably, from about 670 to about 800 degrees centigrade.

Once the pellets have been ignited, they burn spontaneously in a self-sustaining reaction which produces a substantial amount of heat. In general, the reaction wave propagates at a rate of from about 0.1 centimeters per second to about 1.5 centimeters per second. The reaction time is a function of the amount of pellets being combusted. The reaction temperature is generally from about 1700 to about 2300 degrees centigrade.

In one preferred embodiment, the pellets are ignited with a hot wire. A chromel-alumel hot wire which is red-hot and at a temperature of least about 800 degrees centigrade is used to ignite the pellets. Once the pellets are ignited, the ignition point is transformed into a reaction front which consumes at a velocity of from about 0.1 and 1.5 centimeters per second.

The reacted pellets are then discharged via line 60 to refractory tray 62, wherein they are allowed to cool under ambient conditions to a temperature of from about ambient to about 200 degrees centigrade room temperature.

The reacted pellets are comprised of both impure material and the desired composite of alpha silicon carbide whiskers and alumina. In one embodiment, the crude product is gently crushed by screening.

In this embodiment, the cooled pellets are passed via line 64 to four-deck vibratory sieve 66. The vibratory sieve 66 preferably has at least five sieves which sequentially screen and/or treat the combusted pellets.

The first screen in the vibratory sieve, into which the combusted pellets are first discharged, is 2.5 mesh (8 millimeters sieve opening). Material which passes through this sieve is then passed to the second vibratory sieve.

The second screen in the vibratory sieve is 16 mesh (1 millimeter sieve opening). It is preferred to locate rubber rings in the bottom of said sieve; these rings are solid rubber and are about 1.0 inch in diameter. The rubber rings gently crush the pellet material. Material which passes through the second sieve are passed to the third vibratory sieve.

The third vibratory sieve is 28 mesh (0.6 millimeter opening). The bottom of this sieve also contains 1.0 inch diameter rubber rings to assist in gently crushing the pellet material. Material which passes through this third sieve is primarily silicon carbide whisker material and alumina powder and alumina agglomerates, and it passes to the fourth vibratory sieve.

The fourth vibratory sieve is 60 mesh (0.25 millimeter opening) which will separate the valuable silicon carbide whisker material (which also contains some alumina agglomerates) from the rest of the pellets. The material which passes through this sieve is collected on the bottom pan. This material is a mixture of dispersed silicon carbide whiskers in alumina powder.

The desired silicon carbide whisker material, which is collected on the pan, is a composite comprised of from 25 to 45 percent of alpha silicon carbide (by weight of silicon carbide and alumina), and from about 63 to about 71 percent of alumina (by weight of silicon carbide and alumina). The silicon carbide material in the composite comprises at least 80 weight percent (by weight of silicon carbide) of silicon carbide whiskers.

If material remains on the first sieve, it is passed via line 68 to mill 70 where it is ground, preferably together with 0.1 percent (by weight) of oleic acid until it will pass a 325 mesh sieve, and the ground material is then passed via line 18 to ball mill 10. If no material remains on the first sieve, then the material which remains on the second sieve is so ground and recyled. If no material remains on the second sieve, then the material which remains on the third sieve is ground and recycled. If no material remains on the third sieve, then a portion of the material which remains on the fourth sieve is so ground and recycled. The material passing thorugh the fourth sieve is a composite of silicon carbide whiskers and aluminum oxide powder; it may be hot-pressed into ceramic articles.

HEAT TREATMENT OF THE SILICON CARBIDE COMPOSITE MATERIAL

In one preferred embodiment, the material passing through the fourth sieve is subjected to a thermal conditioning cycle. In this embodiment, the material is introduced into a high-temperature furnace.

Referring to FIG. 1, the composite material from the fourth sieve of vibratory screen 66 is passed via line 72 to tumbler 73 in which the material is tumbled for from about 4 to about 5 hours; as is known to those skilled in the art, a small jar without grinding media may be used as a tumbler. The purpose of the tumbling is to provide a more homogenous composite.

The blended composite material from tumbler 73 is then passed to furnace 74, where it is thermally conditioned. The conditioned material from furnace 74 is thereafter passed via line 76 to vibratory screen 78.

The thermal conditioning treatment occurs in a high-temperature furnace able to reach a temperature in excess of 1,600 degrees centigrade. Such high-temperature furnaces are well known to those skilled in the art and are described, e.g., on pages 606–612 (and in the references cited in these pages) of the McGraw-Hill Encyclopedia of Science & Technology, Volume 5 (McGraw-Hill Book Company, New York, 1977), the disclosures of which are hereby incorporated by reference into this specification.

High-temperature furnace 74 is preferably a graphite furnace containing a graphite heating element or inductive susceptor; and the thermal conditioning treatment is conducted under a protective atmosphere, such as nitrogen, in the absence of oxygen or oxygen-containing gas.

After the composite material is charged to the furnace and the furnace is purged with the protective gas, the material is subjected to a specified heat profile. In one embodiment, the material is inserted into the furnace chamber, the chamber is purged with nitrogen, the furnace chamber is subjected to a vacuum pump until a partial pressure of less than about 150 milliTorr is obtained, and then the material in the furnace is heated from ambient temperature to a temperature of from about 350 to about 500 degrees centigrade at a rate of from about 15 to about 30 degrees per minute. It is preferred to first heat the composite material from ambient conditions to a temperature of from about 380 to about 450 degrees centigrade. It is even more preferred to heat the composite material to a temperature of from about 400 to about 420 degrees centigrade. In another embodiment, the material is subjected to the same processing conditions with the exception that the vacuum is not applied to the furnace chamber.

After the material has been heated to a temperature of from about 350 to about 500 degrees centigrade, it is maintained at the specified temperature and pressure conditions (if any) for at least about 5 minutes. It is preferred to maintain the material under these conditions for at least about 15 minutes. In general, it is not necssary to maintain the material under these conditions for more than about 30 minutes.

In the second step of the thermal conditioning, the material is raised from its temperature of from about 350 to about 500 degrees centigrade to a temperature of from about 1250 to about 1350 degrees centigrade at a rate of from about 15 to about 25 degrees per minute. It is preferred to raise it to a temperature of from about 1300 to about 1325 degrees centigrade at a rate of from about 18 to about 22 degrees per minute. Prior to the time the material is raised to the temperature of from about 1,250 to about 1,350 degrees centigrade, the vacuum in the furnace, if any, is removed, protective gas (such as nitrogen) is introduced into the chamber, and a pressure of from about 5 to about 15 pounds per square inch is introduced into the chamber. For the remainder of the thermal conditioning cycle, the furnace chamber is maintained under said pressure of from about 5 to about 15 pounds per square inch and under said protective atmosphere. It is more preferred to utilize a pressure of from about 5 to about 10 pounds per square inch.

Once the material has been subjected to said temperature of from about 1,250 to about 1,350 degrees centigrade, said pressure of from about 5 to about 15 pounds per square inch, and said protective atmosphere, it is maintained under said conditions for at least about 30 minutes. It is preferred to maintain the material under these conditions for from about 30 to about 60 minutes.

In the third stage of the thermal conditioning, the material may be raised from its temperature of from about 1250 to about 1350 degrees centigrade to a temperature of from about 1650 to about 1750 degrees centigrade at a rate of from about 7 to about 15 degrees per minute. Once the material has reached such temperature, it generally is maintained at this temperature for from about 30 to about 90 minutes.

In one preferred embodiment, in this third stage, the material is raised to a temperature of from about 1,650 to about 1,670 degrees centigrade and, once at this temperature, maintained there for from about 30 to about 40 minutes. The material produced in this embodiment contains at least about 25 percent of silicon carbide whiskers with a length of at least 10 microns. The powdered alumina matrix has a high capability of being sintered. The material is suitable for hot-pressing of small, relatively uncomplicated objects such as, e.g., cutting tools.

In another preferred embodiment, in this third stage, the material is raised to a temperature of from about 1,650 to 1,670 degrees centigrade and, once at this temperature, is maintained there for from about 40 to about 70 minutes. The material produced by this process contains at least about 25 percent of silicon carbide whiskers with a length of at least about 20 microns. This material is suitable for preparing parts with relatively complicated geometries and/or larger sizes by hot pressing. The material is also suitable for hot, isostatic pressing.

In another preferred embodiment, in this third stage, the material is heated to said temperature of from about 1,650 to about 1,670 degrees centigrade and is maintained at such temperature for from about 70 to about 90 minutes. The material produced in this embodiment has at least about 25 percent of silicon carbide whiskers with a length of about 20 microns. This material is suitable for hot pressing. Furthermore, this material may be processed by injection molding techniques well known to those skilled in the art.

The injection molding process is well known to those skilled in the art and is described, e.g., on pages 590 to 592 of Brage Golding's "Polymers and Resins," (D. Van Nostrad Company, Inc., Princeton, New Jersey, 1959), the disclosure of which is hereby incorporated by reference into this specification. Injection molding of ceramic materials is described on pages 373 to 377 of James S. Reed's "Introduction to the Principles of Ceramic Processing," (John Wiley & Sons, New York, 1988), the disclosure of which is also hereby incorporated by reference into this specification.

When injection molding the material described in the last mentioned embodiment, the material is dispersed in a thermoplastic binder, which often includes both thermoplastic material and one or more surfactants. Suitable thermoplastic materials are well known to those skilled in the art and include, e.g., solid paraffins, stearic acid, waxes, and the like. The surfactants used preferably are one or more fatty acids, such as oleic acid. It is preferred to disperse from about 75 to about 92 percent of the composite in from about 8 to about 25 percent of the thermoplastic binder. The thermoplastic slurry is then injected into the mold and usually molded at a viscosity of from about 5 to about 80 centipoise. The thermoplastic slurries can be used with high-pressure injection molding techniques (at pressures of greater than about 400 p.s.i.) or with low-pressure injection molding techniques, often known as hot molding, under low pressure (at pressures of from about 15 to about 400 p.s.i.).

In another embodiment, in this third stage, the material is raised to a temperature of from about 1,670 to about 1,700 degrees centigrade and, once at this temperature, is maintained there for at least about 30 minutes and, preferably, from about 30 to about 60 minutes. In this embodiment, the composite material contains at least about 30 percent of whiskers with a length of at least about 10 microns. This material is suitable for hot pressing and hot isostatic pressing of small parts such as, e.g., cutting tools.

In yet another embodiment, the material is raised to said temperature of from about 1670 to about 1,700 degrees centigrade and, once at such temperature is maintained there for at least about 70 mintues and preferably from about 70 to about 90 minutes. The material produced in this embodiment is suitable for hot pressing and hot isostatic pressing of larger parts, such as extrusion die parts.

In another embodiment, in this third stage, the material is raised to a temperature of from about 1,700 to about 1,750 degrees centigrade. In one aspect of this embodiment, the material is maintained at this temperature for at least about 30 minutes and preferably from about 30 to about 45 minutes; this material contains at least about 35 percent of silicon carbide whiskers with a length of at least 10 microns and is suitable for hot pressing, hot isostatic pressing, and the production of small and/or medium parts. In another aspect of this embodiment, the material is maintained at this temperature for at least 60 minutes and, preferably, for from about 60 to about 90 minutes; the material so produced contains at least about 35 percent of silican carbide whiskers greater than 20 microns in length and is suitable for hot pressing, hot isostatic pressing, and the production of large parts such as tiles.

After the material has been subjected to a temperature of from about 1650 to about 1750 degrees centigrade for the specified amount of time, it is allowed to cool under controlled conditions at a cooling rate of from about 10 to about 20 degrees per minute until it reaches about 1,000 degrees centigrade. Then the material is allowed to cool to ambient temperature under the protective atomsphere in the furnace. Alternatively, one can induce additional cooling at this stage by cooling means in the furnace.

The cooled material is then discharged via line 76 to vibratory sieve 78. It is preferred that vibratory sieve 78 be substantially identical to vibratory sieve 66. After such sieving, the material is then preferably passed via line 80 to tumbler 82, where it is tumbled for from about 2 to about 6 hours.

In another embodiment, the material from vibratory sieve 66 is subjected to an alternative heat treatment cycle under a high-purity nitrogen atmosphere. In this embodiment, the first two steps of the heat-treatment cycle are identical to those described above. In the third step, however, the material is raised from its temperature of from about 1250 to about 1350 degrees centigrade to a temperature of from about 1750 to about 1900 degrees centigrade at a rate of about 5 to about 10 degrees per minute. It is preferred to raise the material to a temperature of from about 1800 to about 1850 degrees centigrade at a rate of from about 6 to about 8 degrees per minute. After the material has been raised to this elevated temperature, it is maintained at this temperature for from about 90 to about 120 minutes under nitrogen atmosphere. The product obtained in this embodiment is a composite of silicon carbide whiskers in a matrix of aluminum oxynitride powder.

In another embodiment, the composite of silicon carbide whiskers and aluminum oxynitride is subjected to a temperature of from about 1,900 to about 2,100 degrees centigrade for from about 90 to about 120 minutes. This further treatment facilitates the separation of the silicon carbide whiskers (which are converted in part to platelets) from the aluminum oxynitride matrix.

In another embodiment, the composite material from vibratory sieve 78 is subjected to froth flotation in order to separate the aluminum oxide from the silicon carbide whiskers. In this froth flotation separation process, one uses an ionic surfactant which will cause the silicon carbide whiskers to disperse in solution and form a stable suspension while causing the aluminum oxide powder to agglomerate and precipitate.

In one embodiment, any or all of the silicon carbide whisker composites of this invention are formed into shaped bodies with an interstitial porosity of from about 50 to about 80 volume percent, which bodies have sufficient strength to be manipulated and subjected to liquid infiltration of molten metals. The silicon carbide whisker composite can be formed into such porous body by cold isostatic pressing, by hot die casting under low pressure, or by injection molding. The green bodies so formed are then fired at a temperature of about 1300 to about 1500 degrees centigrade for from about 1 to about 2 hours. The porous bodies thus formed can then be infiltrated with molten alloy metals such as, e.g., aluminum based alloys, magnesium based alloys, titanium based alloys, nickel based alloys, and the like. The infiltrated bodies represent a class of metal-matrix composites reinforced by a ceramic phase.

In one preferred embodiment, a structural ceramic body with improved fracture toughness, wear resistance, and abrasiveness is provided. In this embodiment, the silicon carbide whisker composite from tumbler 82 is transferred to a mold and subjected to hot-pressing at a temperature of about 1600 to about 1700 degrees centigrade and a pressure of from about 200 to about 600 atmospehres. Alternatively, and/or additionally, one may use hot isostatic pressing at a temperature of from about 1300 to about 1500 degrees centigrade and pressure of from about 1,000 to about 2,000 atmospheres for from about 30 minutes to about 2.0 hours.

PRESSURE ASSISTED SINTERING OF THE READY TO PRESS COMPOSITE MATERIAL

The thermally conditioned ceramic material made by the procedure described above is a well-dispersed material which generally contains at least about 35 percent (by total weight of composite) of silicon carbide, and alumina. The composite consists essentially of silicon carbide an alumina, i.e., at least about 95 weight percent of the composite consists of silicon carbide and alumina; other ingredients may be present in the composite in minor amounts. Of the silicon carbide portion, at least 80 percent (by total weigth of silicon carbide) is comprised of needle-like, single crystal silicon carbide whikers whose diameters are from about 0.5 to about 1.5 microns, whose length is from about 20 to about 200 microns, and whose aspect ratios are form about 40 to about 120 . At least about 99 percent of the silicon carbide has the hexagonal structure of alpha silicon carbide. The composite contains less than about 0.1 percent, by total weight of composite, of free carbon and less than about 0.1 weight percent, by total weight of composite, of composite, of silica. The alumina matrix in the composite consists of well-defined hexagonal structure of alpha-alumina. The size distribution of the alumina is such that substantially 100 percent of the alumina particles are between 0.5 and 5.0 microns. The alumina crystal network has a large concentration of defects, making it highly suitable for sintering.

The thermally conditioned composite described above is then subjected to hot pressing. As is known to those skilled in the art, sintering during the application of external pressure is called hot pressing. See, e.g., pages 470-471 of James S. Reed's "Introduction to the Principles of Ceramic Processing," supra. One may use uniaxial hot pressing in a refract manufactured from grapite, stablized zirconia, or a refractory. One may use hot isostatic pressing.

Any of the hot presses known to those skilled in the art may be used in this process. Thus, e.g., one may use hot presses obtained from Thermal Technology, Inc., Astro Division, 606 Olive Street, Santa Barbara, California 93101. Thus, e.g., one may use hot presses obtained from Vacuum Industries, Inc., 5 Middlesex Avenue, Somerville, MA. 02145.

In the first step of the hot pressing process, the thermally conditioned material is loaded into the refractory die of the press. When the die consists of graphite, it is preferred to line the die with a thin sheet of graphite foil such as "GRAF OIL" (sold by Union Carbide), or with boron-nitride powder such as, e.g., the boron-nitride powder spray sold by the Carborundum Division of Sohio.

Figure 2:
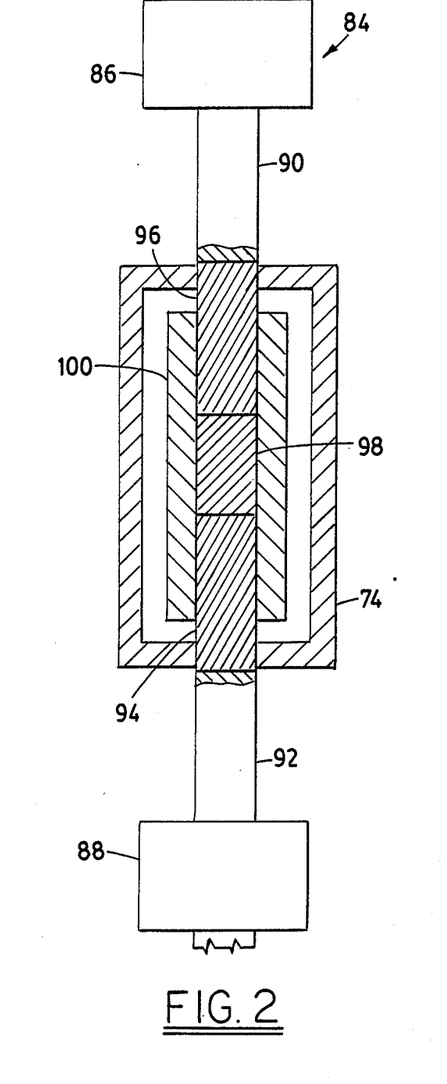
FIG. 2 illustrates one pressing apparatus which may be used in the process of the invention.

One suitable hot-pressing arrangement is illustrated in FIG. 2. Referring to FIG. 2, hot press apparatus 84 is comprised of hydraulic pumps 86 and 88 which are connected, respectively, to stainless steel plungers 90 and 92 which, preferably, are cooled. Each of plungers 90 and 92 are connected to graphite plungers 94 and 96, which contact and compress the composite material 98. The composite material 98 is disposed within graphite die 100 which, in turn, is disposed within high-temperature furnace 74. As will be apparent to those skilled in the art, other suitable hot-pressing arrangements also can be used.

In one embodiment, while the material is the die 100, it is preferably pressed at a pressure of from about 50 to 150 pounds per square inch and ambient temperature for at least 30 seconds. The pressure is released, the die is introduced into the furnace, and the heat of the furnace is increased. This initial pressing, although not essential, is useful to eliminate air and oxygen from the powder material.

After the material has been inserted into the furnace, the furnace is preferably evacuated by vacuum pump to a pressure, of less than about 150 milliTorr. The furnace chamber is purged with a protective gas such as nitrogen. After the material has been blanketed with nitrogen, the temperature of the material is raised to from about 1,250 to about 1,450 degrees centigrade.

Once the material in the die has reached a temperature of from about 1,250 to about 1,450 degrees centigrade, then the pressure on the material is gradually increased from ambient pressure to from about 25 percent to about 35 percent of the final pressing pressure while the temperature of the material is gradually increased to a temperature of from about 1,650 to about 1,900 degrees centigrade. The final pressing pressure is the highest pressure experienced by the material during the whole pressing cycle, and it generally will range from about 3,000 to about 7,000 pounds per square inch. In general, the pressure and temperature are increased over a period of from about 20 minutes to about 60 minutes.

After the material has been subjected to from about 25 to about 35 percent of the final pressing pressure, and has reached the temperature of from about 1650 to about 1900 degrees centigrade, it is maintained under said temperature of from about 1650 to about 1900 degrees centigrade for from about 30 to about 90 minutes. During this period, the pressure on the material is increased from 25 to 35 percent of the final pressure to 100 percent of the final pressure. Said increase may be gradual, incremental, or sudden.

After the material has reached the final pressure of from about 3000 to about 7000 psi and the soak period at the temperature of from about 1650 to about 1900 has ended, it may be cooled. It is preferred to subject the material to controlled cooling under nitrogen in the furnace under the same conditions while the pressure on the material is released; the pressure may be released gradually, incrementally, or suddenly. It is preferred to cool the material at a rate of from about 8 to about 15 degrees per minute. The cooling process described in another portion of this specification may be used to cool the material. Alternatively, or additionally, other cooling procdesses well known to those skilled in the art also may be used.

In one embodiment of this invention, a process is provided in which pellets are prepared from said silica, said aluminium, and said carbon agglomerate in precisely the manner described above with one exception: from about 5 to about 20 weight percent (by total weight of pellet) of a moderator are used to prepare pellets. With the exception of the addition of the moderator prior to pelletelizing to the silica/aluminum/carbon mixture, every other aspect of the prior process is the same.

As used in this specification, the term moderator refers to a material in a condensed phase, such as aluminum oxide or silicon carbide powder, which is mixed with the reagents to slow down the combustion front velocity occurring after ignition.

In this embodiment, it is preferred to add from about 8 to about 15 weight percent of the moderator (by total weight of pellet) to the silica/aluminium/carbon mixture.

The moderator is preferably ground with the carbon, the source of metal-containing component (if any), and the source of hydrogen fluoride (if any) to prepare the carbon agglomerate. Thereafter, as before, the carbon agglomerate is mixed with the silica slurry and the aluminum.

As indicated above, the moderator may be the silicon carbide whisker/alumina composite. Alternatively, or additionally, the moderator may be a silicon carbide only, alumina only, mixtures of silicon carbide and alumina, other inert materials. Suitable inert materials include, e.g., graphite powder or fiber, and refractory ceramic oxide non-oxide materials.

Without wishing to be bound to any particular therory, applicant believes that moderation permits control of the reaction and the use of the thermal energy free the process. Any possible means of moderation should have the capacity of slowing down the reaction rate in some degree and influencing one of the elementary processes of the reaction kinetics (such as the chemical process proper, the diffusion of reactants, nucleation, and crystal growth of products).

Moderation may be achieved by a decrease of the reaction rate caused by a reduction in the surface energy of the reactants. Such a reduction can be caused by increasing grain sizes, covering the grains with a thin layer of inert oxide, or adsorption of the reactant surface of a mono- or poly-molecular layer of a surface-active agent.

Moderation may be achieved by a partial absorption of the energy generated by the reaction. This absorption can occur in a fluidized-bed reaction with continuous injection and cyclic ignition; in this embodiment, the thermal energy obtained is rapidly removed from the system and can be used for other purposes. This absorption can occur with the introduction of inert substances which do not react with either the reactants or the products but absorb part of the thermal energy released during the reaction; these substances are mixed in the reactant composition and undergo physical transformations (melting or sublimiation) or chemical transformation (decomposition or combustion). This absorption can be effected by introduction of chemically inert substances which do not react with either the reactants or the products but interpose themselves between the reactants and delay diffusion of the more mobile reactant towards the "covered" one.

The moderator substance may act by densifying the reaction product and, by that, reducing the reactant diffusion rate. Alternatively, the moderator may aggregate the more mobile reactant, causing it to diffuse from the interior to the surface of the inert substance and only after that through the product layer to the reaction zone.

Moderation may result from introduction of active substances which enter into weak exothermic or even mildly endothermic reactions with the reaction product. In this case, one may obtain valuable secondary products sintering jointly with the main reaction products. One may create an oxidizing, reducing, or inert environment in the course of the reaction, simultaneously increasing the pressure under which the reaction takes place.

Moderators may be classified accoridng to their reaction mode. The, one classification is moderators which leave the system while the reaction is in progress, or those which are readily eliminated after its completion. For example, organic powders that mechanically separate the reactant groups from one another may be used (such as, e.g., rubber, resins, etc.); they leave the system entirely while the reaction advances through combusion or volatilization. For example, organic binders which are adsorbed on the surface of the grains may be used (e.g., waxes, higher fatty acids, higher alcohols); they are similarly eliminated. For example, inorganic salts which interpose themselves between reactant groups may be used (e.g., sodium chloride, potassium chloride); they are totally or partially eliminated by decomposition or volatilization, and the residue is readily eliminated by leaching.

Another classification is moderators which do not leave the system. Thus, one may use reaction products that interpose themselves between groups of reactants but also between individual reactants and thicken the reaction product layer between the covered reactant and the covering one; this category of moderators remain in the system and may sinter together with reaction products (e.g., alumina). Thus, one may use an excess of metallic oxide; the surplus acts as a moderator by delaying diffusion; this moderator also remains in the system and may sinter with the products (e.g., excess silica). One may also use compounds which react with the products; thsese secondary products can take part in subsequent sintering porocesses (e.g., carbon).

In this embodiment, the use of a moderator allows one to obtain a composite with a higher yield of long silicon carbide whiskers.

PREPARATION OF SILICON NITRIDE WHISKERS

The process of this invention can be utilized to prepare materials other than silicon carbide whiskers. Thus, for example, silion nitride whiskers may be prepared by such process.

In this embodiment, the pellet produced in the process is comprised of from about 46 to about 58 weight percent (by total weight of solid material in the pellet) of silica, from about 26 to about 36 weight percent of aluminum material, and from about 6 to about 28 weight percent of silicon nitride. The same silica starting material described above is used; the same aluminum material also is used. The silicon nitride material used is alpha silicon nitride which has at least 90 weight percent of alpha silicon nitride, and less than about 1 percent of free silicon. A suitable silicon nitride material is that sold by Hermann C. Stack Company (West Germany) under the designation of "Grade H2".

In this embodiment, the silica is first well dispersed in a non-aqueous liquid. Thereafter, the aluminum material and the silicon nitride material are mixed with the silica slurry. The silica/aluminum/silicon nitride slurry is then pelletized, preferably by sieving as described above, to produce pellets which contain from about 80 to about 92 volume percent of solids and which have a density of from about 0.3 to about 1.7 grams per cubic centimeter. These pellets are thereafter dried to a moisture content of from about 0.1 to about 2.0 percent, and the dried pellets are placed in pressurized reactor under nitrogen atmopshere; the pressure used is from about 150 to about 7,000 pounds per square inch. Once the pellets are in the pressurized reactor, they are ignited by being subjected to a heat sourcew at a temperature of at least about 670 degrees centigrade.

PREPARATION OF TITANIUM DIBORIDE WHISKERS

In one embodiment, titanium diboride whiskers are prepared by the process of this invention. In this embodiment, the charge is comprised of from about 25 to about 45 percent (by total weight of solids in the pellet) of boron oxide, from about 28 to 38 weight percent of titanium dioxide, and from about 32 to about 42 weight percent of aluminum material.

In this embodiment, the boron oxide is dried to a moisture content of less than about 1.0 weight percent of water. This dried boron oxide is then dry-ground in a vibratory mill, preferably in the prescence of from about 0.1 to about 0.5 weight percent of surfactant (such as, e.g., oleic acid); the boron oxide is preferably ground until at least about 80 weight percent of its particles are smaller than 10 microns.

After the boron oxide has been ground to the desired degree of fineness, titanium dioxide and aluminum material are added to the mill; the aluminum material is identical to that described above. The reaction mixture is then ground to agglomerate it.

The agglomerate produced in the vibratory mill is then pelletized in, e.g., an Eirich Mixer in the presence of paraffin oil (or, alterntively, in the presence of one or other suitable binders). The pellets thus produced are then subjected to heat treatement under ambient conditions at a temperature of from about 400 to about 600 degrees centigrade in a pusher type furnace for from about 10 to about 20 minutes.

The heat treated pellets are then ignited in a reactor by being contacted with a heat source at a temperture of at least about 1,000 degrees centigrade.

PREPARATION OF BORON CARBIDE WHISKERS

In another embodiment, boron carbide whiskers are prepared by the process of this invention. In this embodiment, the pellets is comprised from about 55 to about 65 weight percent of boron oxide, from about 41 to 46 weight percent of aluminum material, and from about 4 to about 8 weight percent of amorphous carbon. The amorphous carbon, the aluminumaterial, and the boron oxide material are described above.

In this embodiment, the procedure described for the preparation of titanium diboride whikses is used, with the exceptions that: (1) the weight ratios of the starting materials are different, (2) the agglomerate is heat-treated at under nitrogen atomsphere, and (3) the ignition temperature is at least about 700 degrees centigrade.

PREPARATION OF TITANIUM CARBIDE WHISKERS

The process of this invention also may be used to prepare titanium carbide whiskers. In this embodiment, the pellet is comprised of from about 33 to about 38 weight percent of titanium dixoide (rutile), from about 45 to about 52 weight percent of aluminum material, from about 16 to about 20 weight percent of amorphous carbon, from about 1 to about 5 weight percent of a source of carbon monoxide, and from about 1 to about 5 weight percent of a source of hydrogen fluoride.

In the first step of this process, a mixture of the titanium dioxide, the source of carbon monoxide, and nonaqeueous liquid is prepared. As with the silicon carbide whisker process, the titanium dioxide slurry should be well dispersed and have agglomerates.

In the second step of the process, an agglomerated mixture of the amorphous carbon and the source of hydrogen fluoride is prepared. Thereafter, this agglomerated mixture and aluminum material are mixed with the titania slurry. The slurry thus produced is pelletized by sieving in accordance with the procedure described for the silicon carbide whiskers, and the pellets so produced are then dried and ignited as described above.

It is to be understood that the aforementioned description is illustrative only and that changes can be made in the apparatus, the ingredients and their proportions, and in the sequence of combinations and process steps as well as in other aspects of the invention discussed herein without departing from the scope of the invention as defined in the following claims.

I claim:

1. A process for preparing a composite material comprised of silicon carbide. comprising the steps of sequentially:

(a) providing a composite material which is comprised of from about 25 to about 45 percent of alpha silicon carbide and from about 63 to about 71 percent of alumina, provided that least about 85 percent of such composite material is selected from the group consisting of alpha silicon carbide, alpha alumina, and mixtures thereof, wherein at least about 80 percent of such silicon carbide is comprised of silicon carbide whiskers;

(b) raising the temperature of said material to a temperature of from about 350 to about 500 degrees centigrade at a rate of from about 15 to about 30 degrees per minute while subjecting said material to a pressure of less than about 150 milliTorr;

(c) maintaining said material at said temperature of from about 350 to about 500 degrees centigrade for at least about 5 minutes while subjecting said material to a pressure of less than about 150 milliTorr;

(d) raising said material from said temperature of from about 350 to about 500 degrees centigrade to a temperature of from about 1,250 to about 1,450 degrees centigrade at a rate of from about 15 to about 25 degrees per minute while blanketing said material with an atmosphere which consists of inert gas;

(e) subjecting said material to said temperature of from about 1,250 to about 1,450 degrees centigrade and a pressure of from about 5 to about 15 pounds per square inch for a period of at least about 30 minutes while blanketing said material with an atmosphere consisting of inert gas;

(f) raising the temperature of said material to from about 1,650 to about 1,900 degrees centigrade at a rate of from about 7 to about 15 degrees per minute while subjecting said material to a pressure of from about 5 to about 15 pounds per square inch and while blanketing said material with an atmosphere consisting of inert gas;

(g) subjecting said material to said temperature of from about 1,650 to about 1,900 degrees centigrade for from about 30 to about 90 minutes while subjecting said material to a pressure of from about 5 to about 15 pounds per square inch and while blanketing said material with an atmosphere consisting of inert gas; and (h) thereafter cooling said material.

2. The process as recited in claim 1, wherein said material is heated to a temperature of from about 380 to about 450 degrees centigrade while being subjected to said pressure of less than about 150 milliTorr.

3. The process as recited in claim 1, wherein said material is heated to a temperature of from about 400 to about 420 degrees centigrade while being subjected to said pressure of less than about 150 milliTorr.

4. The process as recited in claim 1, wherein, while said material is having its temperature raised from a temperature of from about 350 to about 500 degrees centigrade to a temperature of from about 1,250 to about 1,350 degrees centigrade, it is blanketed by nitrogen and subjected to a pressure of from about 5 to about 15 pounds per square inch.

5. The process as recited in claim 4 wherein, while said material is having its temperature raised from a temperature of from about 350 to about 500 degrees centigrade to a temperature of from about 1,250 to about 1,350 degrees centigrade, it is subjected to a pressure of from about 5 to about 10 pounds per square inch.

6. The process as recited in claim 5, wherein said material is maintained at said temperature of from about 350 to about 500 degrees centigrade for at least about 15 minutes.

7. The process as recited in claim 6, wherein the temperature of said material is raised from said temperature of from about 350 to about 500 degrees centigrade to a temperature of from about 1,300 to about 1,325 degrees at a rate of from about 18 to about 22 degrees per minute.

8. The process as recited in claim 5, wherein, after said material has reached said temperature of from about 1,250 to about 1,350 degrees centigrade and said pressure of from about 5 to about 10 pounds per square inch, it is subjected to said temperature and pressure for from about 30 to about 60 minutes.

* * * * *